United States Patent
Meyer

(10) Patent No.: US 10,744,950 B1
(45) Date of Patent: Aug. 18, 2020

(54) PORTABLE MOTOR VEHICLE WORK TABLE SUPPORTED BY THE STEERING WHEEL

(71) Applicant: Robert H. Meyer, Hasbrouck Heights, NJ (US)

(72) Inventor: Robert H. Meyer, Hasbrouck Heights, NJ (US)

( * ) Notice: Subject to any disclaimer, the term of this patent is extended or adjusted under 35 U.S.C. 154(b) by 0 days.

(21) Appl. No.: 16/535,856

(22) Filed: Aug. 8, 2019

(51) Int. Cl.
*B60R 7/04* (2006.01)
*B60R 11/00* (2006.01)
(Continued)

(52) U.S. Cl.
CPC ............... *B60R 7/04* (2013.01); *B60R 11/00* (2013.01); *A47B 31/06* (2013.01); *B60N 3/005* (2013.01); *B60R 2011/001* (2013.01)

(58) Field of Classification Search
CPC .. A47B 31/06; B60R 7/04; B60R 7/08; B60R 2011/001; B60R 2011/0059; B60N 3/005
(Continued)

(56) References Cited

U.S. PATENT DOCUMENTS

| | | | | |
|---|---|---|---|---|
| 1,717,433 A | * | 6/1929 | Bragg | B43L 3/008 248/447.2 |
| 2,150,709 A | * | 3/1939 | Bake | B43L 3/008 281/45 |

(Continued)

*Primary Examiner* — Justin M Larson

(57) ABSTRACT

This invention is constructed of strong lightweight durable material like synthetic thermoplastic resin 5 mm thick or another material with similar characteristics. The material is cut into panels of a specific shape and dimension and bonded together with a proprietary adhesive process. The worktable surface is rectangular. Underneath the work table are two rectangular panels, each attached vertically at a 50° opposing angle, apart 6½" at the top and 15.5" at the bottom. These are referred as the angled gravity studs. Underneath and 14" from the top is a rectangular panel, which is attached horizontally from side to side. This is the stabilizing bar. At the bottom top side of the worktable is a rectangular panel, attached horizontally and from side to side. This is the shelf panel. The work table is grasped by two hands and lifted up and over the crown of the steering wheel. As the work table is directed toward the windshield and then down until the angled gravity studs each come in contact with the steering wheel on either side at approximately 10 o'clock and 2 o'clock thereby securing the table from side to side movement and preventing downward movement. The stabilizing bar contacts the steering wheel at two points on either side of the lower semicircle at approximately 5 o'clock and 7 o'clock. This bar prevents its work table from rocking and in addition serves to lift up the bottom of the work table causing the angled panels to tilt upward creating an angle at the point of contact with the steering wheel which serves to provide a more secure grip on the steering wheel. The work table is now very stable and secure on the steering wheel. The shelf panel or bar serves as a lip or shelf to hold work supplies and work tools. The rectangular tab located underneath at top of the work table between the gravity studs facilitates transport.

7 Claims, 4 Drawing Sheets

(51) Int. Cl.
*A47B 31/06* (2006.01)
*B60N 3/00* (2006.01)

(58) Field of Classification Search
USPC .......................................................... 224/276
See application file for complete search history.

(56) References Cited

U.S. PATENT DOCUMENTS

| | | | | |
|---|---|---|---|---|
| 3,281,109 A * | 10/1966 | Levandowski | ........ | B60N 3/005 248/447.1 |
| 3,952,988 A * | 4/1976 | Easterly | ................. | B43L 3/008 248/447.1 |
| D292,445 S * | 10/1987 | Judge | ........................... | D12/177 |
| 4,974,805 A * | 12/1990 | Douglas | ................. | B60N 3/005 108/44 |
| D335,226 S * | 5/1993 | Horne | ....................... | D12/426.1 |
| 5,413,035 A * | 5/1995 | Fernandez | ............. | B60N 3/005 100/44 |
| D365,219 S * | 12/1995 | Tange | ....................... | D12/426.1 |
| D365,230 S * | 12/1995 | Tange | ....................... | D12/426.1 |
| 5,487,521 A * | 1/1996 | Callahan | ................ | B60N 3/005 248/441.1 |
| D393,237 S * | 4/1998 | Mondo, Jr. | ................. | D12/177 |
| 6,036,158 A * | 3/2000 | Raasch | ................. | B60N 3/005 108/44 |
| 6,038,983 A * | 3/2000 | Lendl | ..................... | B60N 3/005 108/44 |
| 6,062,145 A * | 5/2000 | Lin | ........................ | B60N 3/005 108/44 |
| 6,408,769 B1 * | 6/2002 | Lewis | ..................... | B60N 3/005 108/44 |
| 7,017,878 B2 * | 3/2006 | Guo | ........................ | B60N 3/005 108/42 |
| 7,216,789 B2 * | 5/2007 | Caradimos | ........... | B60R 11/0252 108/44 |
| 7,469,871 B2 * | 12/2008 | Cooper | ................... | A47B 31/06 224/276 |
| 8,079,312 B2 * | 12/2011 | Long | ...................... | B60N 3/005 108/152 |
| 8,096,517 B1 * | 1/2012 | Hamilton | ............ | B60R 11/0252 248/308 |
| 8,327,774 B1 * | 12/2012 | Rivera | ................... | B60N 3/005 108/44 |
| 8,608,037 B2 * | 12/2013 | Stroh | ..................... | B60N 3/005 108/44 |
| D745,604 S * | 12/2015 | Magaudda | ............. | A47B 23/06 D19/88 |
| 9,731,656 B1 * | 8/2017 | States | ....................... | B60R 7/08 |
| D805,973 S * | 12/2017 | Mullaney | ..................... | D12/177 |
| 2008/0029675 A1 * | 2/2008 | Thorwaldson | .......... | B43L 3/008 248/339 |
| 2011/0259690 A1 * | 10/2011 | Clayton | ..................... | G09F 1/10 190/109 |
| 2020/0130401 A1 * | 4/2020 | Rogers | ..................... | B60R 7/04 |

\* cited by examiner

PORTABLE MOTOR VEHICLE WORK TABLE SUPPORTED BY THE STEERING WHEEL

CROSS REFERENCE TO RELATED APPLICATIONS

This application is based upon provisional application 62/766,246 filed Oct. 6, 2018.

STATEMENT REGARDING FEDERALLY SPONSORED RESEARCH OR DEVELOPMENT

Not Applicable.

PARTIES TO A JOINT RESEARCH AGREEMENT

Not Applicable.

DESCRIPTION

Field of the Invention

The invention relates generally to a portable motor vehicle work table supported by the steering wheel.

Background of the Invention

Currently there are not a number of solutions similar to the steering wheel supported work table for problems associated with performing extended work in a motor vehicle while having to use a variety or work-related tools. The existing solutions involve the use of the passenger seat or the console in between the front seats to support and contain the work tools and provide a work surface. Workers who routinely use their automobile as an office for conducting tasks are confronted with the lack of a convenient place to hold and support their work paraphernalia without requiring that their torso be contorted and twisted in order to access and utilize them. Workers who attempt to conduct work while facing forward in the driver's seat will frequently fumble with tools like paper, notebooks, phones, pens etc. They find it difficult to control and conveniently access the implements when needed. Facing forward while performing work and without a solid work surface, often leads to work tools being dropped or misplaced. Recognizing this dilemma, attempts have been made by some to use the steering wheel as a base for a desk, but efforts resulted in work surfaces that were too small and unstable. All of these attempts produced a work surface that was horizontal leaving very little space between the worker and the nearest edge of the desk. Thus, it is very difficult for the worker to perform the necessary physical maneuvers necessary to complete tasks. Using these currently available steering wheel related desks is tedious and uncomfortable making extended work sessions undesirable. These prior art desks have failed to appeal to the worker who is obliged to perform work in a motor vehicle. Their usage has been relegated to serving as surface on which food is placed while eating.

For the worker who uses a motor vehicle, there is a need to accomplish not only transport but also to make phone calls, confirm future appointments, send emails and record important details of prior or future activities etc. Workers using motor vehicles in the field conduct business all day long, travelling from one destination to another, not being able to return to their formal business office. They need a place which is convenient, functional and comfortable as much alike to their formal business office as possible. Details and problems for the travelling worker must oftentimes be dealt with immediately during the day and the work effort would be facilitated greatly if the worker were able withdraw to a quiet place, with the doors closed, absent interruptions in which to work. The motor vehicle offers such a place. Ideally the motor vehicle should have a convenient, well positioned desk or work table, with a very stable work surface which cab be used comfortably and conveniently. Currently available solutions fall far short of the ideal. Consider not having a desk in a formal business office; just files and shelves, and having to work exclusively from your chair and without a work surface.

Prior art patents of interest include U.S. Pat. No. 6,036,158 which discloses a portable steering wheel tray wherein an elongated slot in a table is placed over the steering wheel with side panels to engage the wheel to hold it in place.

U.S. Pat. No. 6,148,738 discloses a laptop table with a basic body having upper spaced hooks to engage the steering wheel and a table mounted to the body which is height and angle adjustable.

U.S. Pat. No. 6,494,148 discloses a steering wheel adjustable table which includes adjustable clamping means for securing the table to the wheel.

Other patents of interest which are distinguishable from the present invention include U.S. Pat. Nos. 3,952,988; 4,896,559; and 8,079,312.

SUMMARY OF THE INVENTION

It would be desirable to have a secure flat inclined work surface directly in front of the occupant of the driver's seat thus enabling a person who uses his motor vehicle as an office to comfortably and expeditiously engage in and complete their work. Furthermore, it would also be desirable to be able to use a computer; conveniently accessing keys and mouse and viewing the monitor with ease while being able to gather work supplies on a secure shelf and being able to write on a stable surface. Still further, it would be desirable to use a steering wheel work table in front of the worker rather than having the steering wheel interfering and limiting the worker's movement for work performed on the passenger seat or on the console or on the lap of the occupant of the driver's seat. Prior art desks designed for use in a motor vehicle are intended to be used on the passenger seat or on the console between the front seats thus forcing the worker to twist their torso awkwardly to the right while shifting their legs and reaching out at arm's length to accomplish their objective. Under these circumstances the steering wheel actually obstructs the work progress. The prior art desks that use the steering wheel as a primary support are ineffective. The currently available products are not as convenient and comfortable to use as the steering wheel supported work table that is described herein. The currently available products do not encourage lengthy work sessions in the automobile and they deter concentration. The current products are clumsy to work with.

Disclosed is the unique motor vehicle work table supported by the steering wheel which overcomes the problems of the prior art. It is made up of the following components: One large rectangular panel serves as the work table surface; two rectangular gravity studs attached underneath the work surface opposite each other at a 50° angle. One rectangular stabilizing bar attached underneath the work surface horizontally from left side to right at a predetermined location; one rectangular panel attached at the bottom of the work surface-serving as a shelf for work instruments. Underneath the work surface, at the top of the work table and in-between the gravity studs is attached a 90° rectangular tab to facilitate the handling and transport of the worktable. The specific angle of the gravity studs and the exact position of the stabilizing bar attached to the underside of the work surface enable the steering wheel worktable to adapt to or fit virtually any size conventional motor vehicle steering wheel. Also, the exact position of the left angled gravity stud is ideal in relation to the left edge of the work surface and ensures that the worktable does not infringe upon the structure of the left front door. This feature also makes the work table adaptable to most available motor vehicles. The work surface is extended slightly on the right side to provide more surface area while maintaining the essential balance necessary to keep the worktable from tilting to the right.

The device may also have one or more of the following advantageous features: The stabilizing bar may incorporate an adjustment device enabling the worker to raise or lower the angle of the worktable. The stabilizing bar, the angled gravity studs and the shelf panel can be hinged thereby enabling the worktable assembly to be collapsible and lie flat taking up less space and facilitating storage and transport. There can also be a multitude of attachments to hold a phone and writing instruments and any number of accessories.

The disclosed device is unique when compared with other known devices and solutions because, (1} it provides a large stable flat work surface positioned directly in front of the worker sitting in the driver's seat of a motor vehicle in order that they may conduct business efficiently and comfortably: (2) it enables the worker to properly access necessary tools and provides a beneficial method to organize their work: therefore, the worker is able to function with greater self-assurance and success. (3} Availing oneself of the steering wheel work table and being familiar with its benefits and functionality enables the worker to better plan his work day and complete the necessary supplemental tasks required. The motor vehicle thus becomes more like a formal office and accordingly the worker is more apt to increase work output.

The disclosed invention is unique in that it is structurally different from other known devices or solutions. More specifically, the device is unique due to the absence of any legs extending to the floor, thereby impeding or discouraging work progress. The angled gravity studs attached to the underside of the work surface contact with the steering wheel of the average motor vehicle at two opposing points. These contact points serve to anchor the table to the steering wheel and the bar attached lengthwise 14" from the top and extending horizontally from side to side serves to further stabilize the work surface locking in the angled gravity studs while preventing unwanted lateral tilting. The shelf is attached at 90° at the bottom of the work table upon which work tools can rest.

Accordingly an object of this invention is to provide a unique and useful work table for use in an automobile.

Another object of this invention is to prove a new and improved worktable that engages the steering wheel of a motor vehicle and may be readily placed in position for use, and more specifically is to provide a new and improved economical and multi-functional work table for use in motor vehicle.

BRIEF DESCRIPTION OF THE DRAWINGS

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. A portable motor vehicle work table supported by the steering wheel may, however, be embodied in many different forms and should not be construed as being limited to the embodiments set forth herein; rather, these embodiments are provided by way of illustration only and so that this disclosure will be thorough, complete and fully convey understanding of those skilled in the art. More specifically.

DETAILED DESCRIPTION OF THE INVENTION

Figure 1:
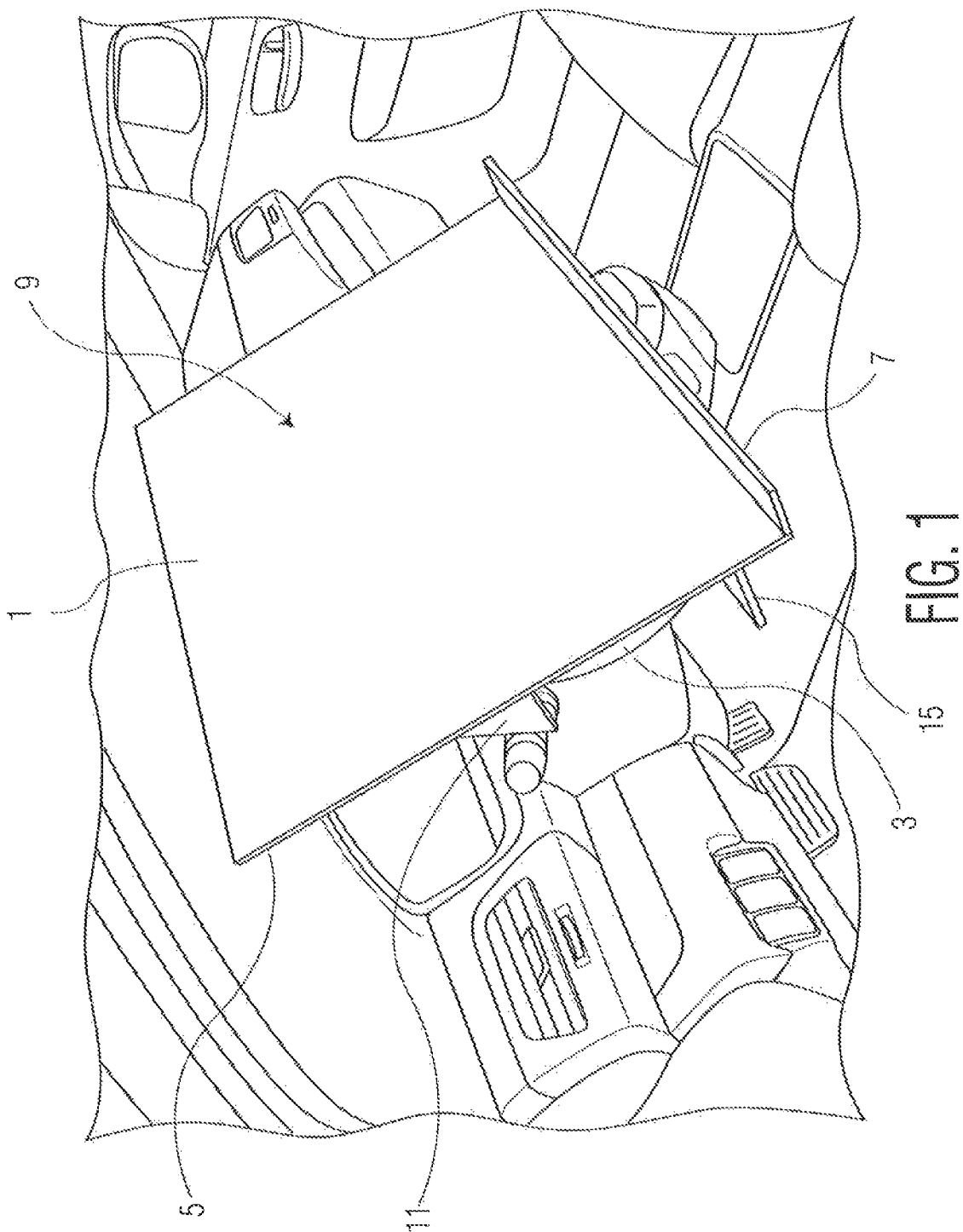
FIG. 1 is a perspective view of the invention as used in a motor vehicle.

The present invention is directed to a portable motor vehicle work table supported by the steering wheel.

The most convenient platform for a worktable 9 in a motor vehicle 30 is the steering wheel 3. Steering wheels 3 are angled at approximately 30° and the angle can often be adjusted. If one were going to design a work surface for the top of a steering wheel they would first be required to prevent the work table 9 from sliding down. This is accomplished by attaching 2 opposing gravity studs 11/13 to the bottom 5 of the worktable 9 at a 50° angle to each other; not joined at the top but 6½" apart. The gravity studs 11/13 are intended to affix on a small area of the crown of any steering wheel 3, depending on the size of the steering wheel 3 at approximately the 10 and 2 o'clock positions This relationship of parts including the studs 11/13 will effectively prevent the work table 9 from sliding down and off the steering wheel 3. Stabilizing the worktable 9; preventing it from rocking side to side, is accomplished by attaching to the underside of the work surface, a 20" stabilizing bar 15 extending horizontally side to side at a predetermined location from the bottom edge 40 of the table 9 and at a 90° angle to the worktable 9. The stabilizing bar 15 contacts the steering wheel 3 at opposite sides of the lower semi-circle at approximately the 5 o'clock and 7 o'clock positions. Stabilization is thereby accomplished. The stabilization bar 15 may be adjustable up and down to raise or lower the bottom of the work table 9 and thereby provide the worker with a surface angle of the work table to suit their preference.

Another problem is to provide the papers, books, computers and other work tools with a secure support surface on which to rest. This is accomplished with a shelf 7 consisting of a 20" panel attached horizontally side to side at the bottom of the work surface 9 at a 90° angle. This results in the shelf to rest the work implements preventing them from sliding off.

A remaining problem is that of facilitating handling and transport. This is accomplished by attaching a rectangular tab 41 underneath near the top of the work surface in between the gravity studs. The tab functions as a grasping point. To facilitate handling and storage of the work table 9, the right and left angled studs 11/13 and the stabilizing bar 15 may be hinged to pivot said elements into a flat position against the underside 5 of the table 9.

Figure 2:
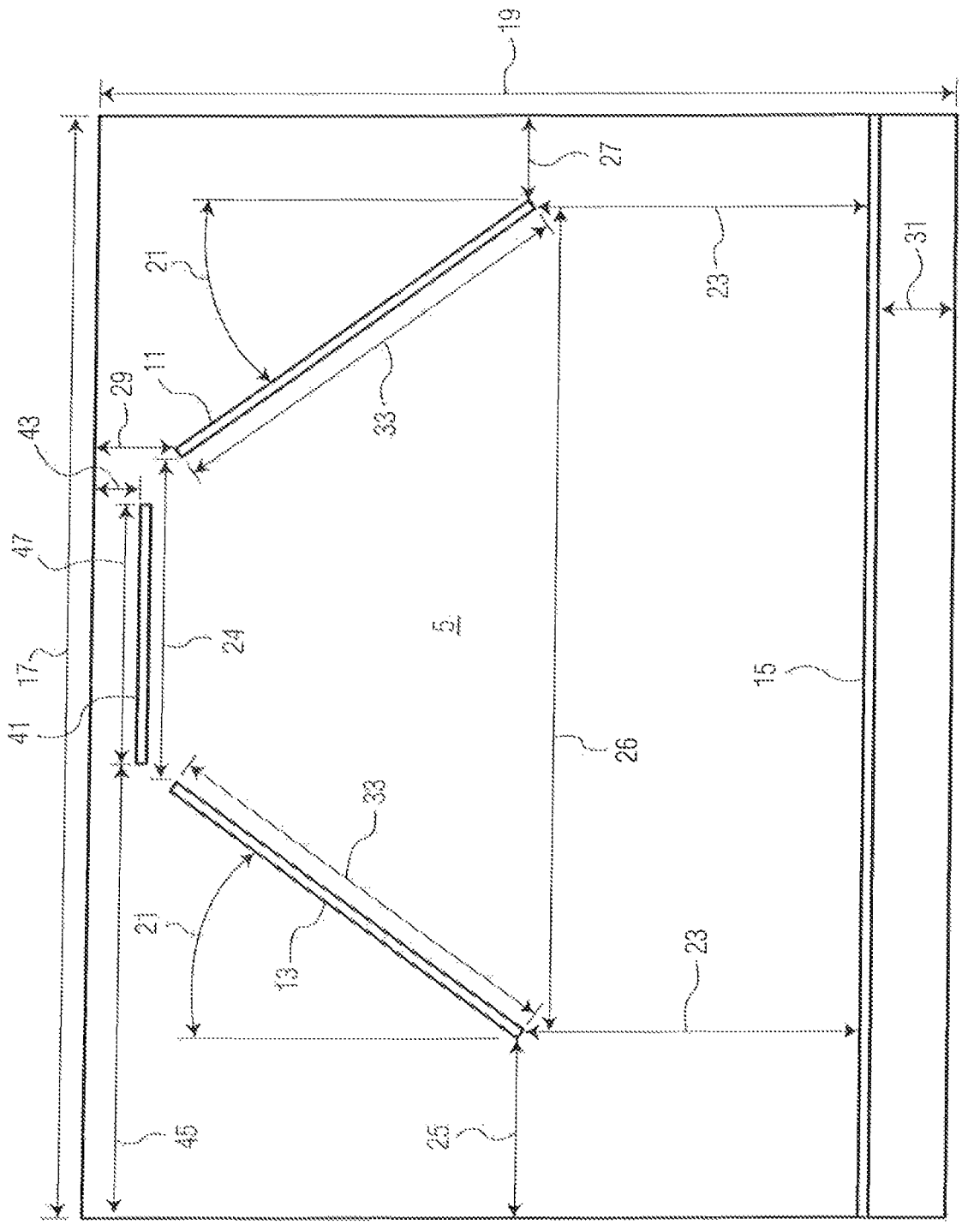
FIG. 2 is a plan view if the bottom of the work table.
Figure 3:
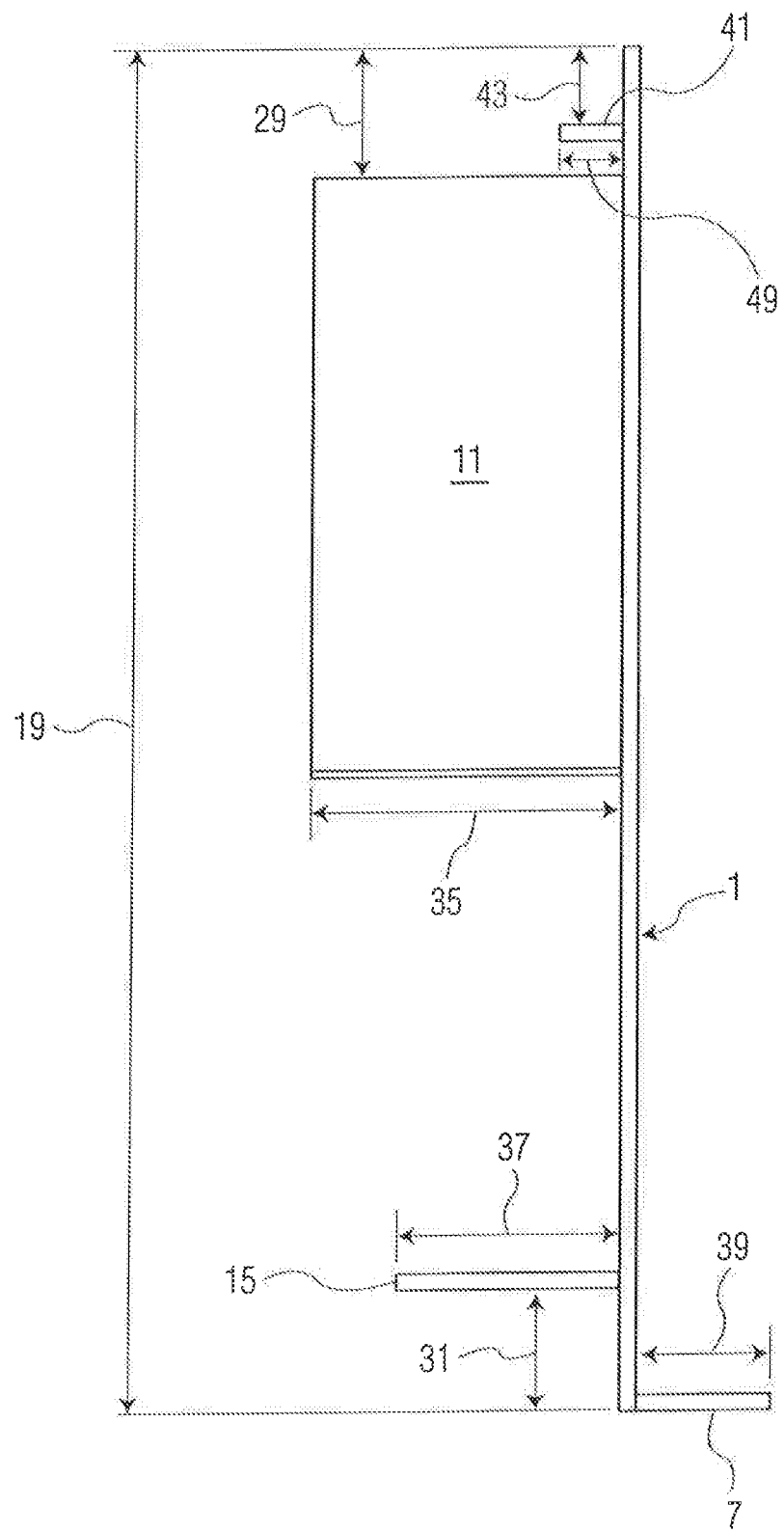
FIG. 3 is a left side view of the work table.
Figure 4:
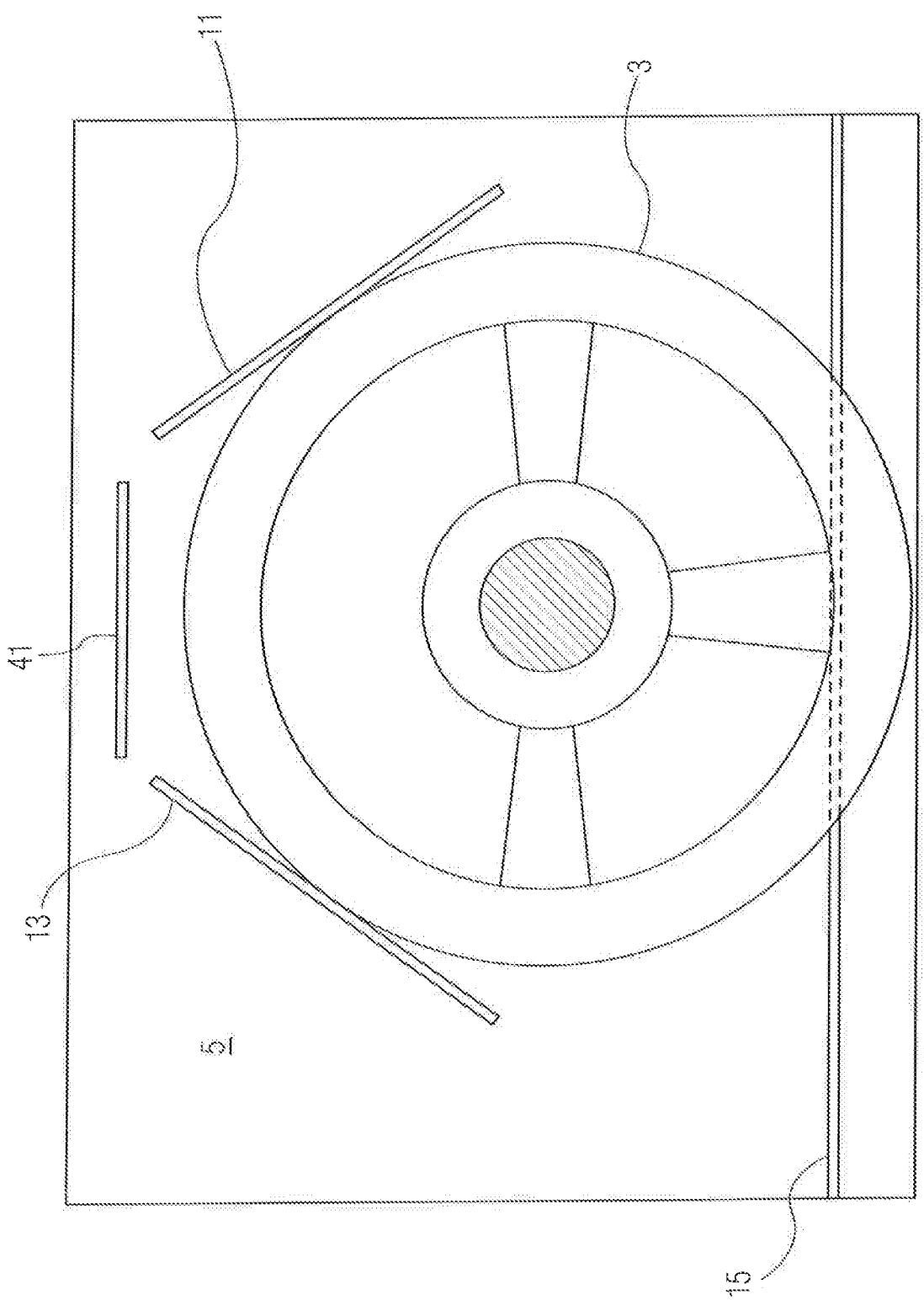
FIG. 4 is a view from the bottom or underside of the work table as it is mounted on the steering wheel.

The dimensions of the worktable component are shown in FIGS. 2 and 3. The worktable 5 length 17 is preferably 20 inches while the vertical measurement 19 is 15 inches. This provides the necessary work space to function efficiently. The angles 21 of the right angled stud 13 and the left angled stud 11 are 40° with the lower end of the left stud 11 being a shorter distance 27 from the work table side edge than the right angled stud distance. The bottom of the studs 11/13 is separated by a distance 26 of approximately 15¼ inches while the tops are separated by a distance 24 of 6¾ inches. The length 33 of the studs 11/33 is approximately 7¾ inches 25. The stabilizing bar 15 is a predetermined short distance 31 from the lower edge of the worktable 5.

Further, the top of the gravity studs 11/13 is a short distance 29 from the upper edge of the table 5. Interposed between the top of the studs 11/13 is a tab 41 which is at a distance 45 from the table side edge and extends for a distance 41 while being situated at a short distance 29 from the upper edge of the table. The tab 41 is designated to facilitate handling of the table 5.

FIG. 3 in particular shows the left underside of the table 5 and its dimensions. The width 35 of the left angled gravity stud 11 is 3¼ inches; the width 37 of the stabilizing bar 15 is 2½ inches, and the width 39 of the shelf panel 7 is 1½ inches. The tab 41 is a predetermined short distance 43 from the edge and extends slightly upward from the table 5 for grouping purposes.

Different features, variations and multiple different embodiments have been described with various details. What has been described in this application, at times in terms of specific embodiments is done for illustrative purposes only and without the intent to limit or suggest that what has been conceived is only one particular embodiment or specific embodiments. It is to be understood that this disclosure is not limited to any single specific embodiment or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A motor vehicle steering wheel mounted work table comprising:
   a rectangular top work surface having upper and lower edges joined by side edges and a bottom edge;
   a transverse rectangular shelf mounted along the lower edge of the table work surface and extending outwardly therefrom at a right angle;
   a left angled gravity stud and a right-angled gravity stud mounted on the bottom of the work surface at a 50° angle to each other; and,
   a stabilizing bar extending across the bottom surface at a predetermined distance from the bottom edge wherein:
   the work table may be manually mounted over the steering wheel and anchored thereon with the angled gravity studs engaging the steering wheel while the stabilizing bar lifts the entire work surface upward preventing the bottom of the work surface from contacting the steering wheel and causing the angled gravity studs to tilt downward obliquely creating a chock which prevents the work table from dislocating and firmly positions the work table for use; wherein the left angled gravity stud and the right angled gravity stud each comprise a rectangular panel extending outwardly at a right angle to the bottom surface of the work table, said rectangular panels having an upper end and a lower end with the lower end of the left stud panel being a predetermined shorter distance from the edge of the work table than the right stud panel to avoid work table contact with the motor vehicle.

2. A motor vehicle steering wheel mounted worktable in accordance with claim 1, wherein:
   the angled studs engage the steering wheel at approximately the 10 o'clock and 2 o'clock positions allowing rapid and exact deployment on the steering wheel preventing the work table from sliding downwardly.

3. A motor vehicle steering wheel mounted worktable in accordance with claim 2 further including:
   hinges mounted to the angled studs and the bottom of the work table to permit the studs to be pivoted against the table to facilitate movement and storage of the work table.

4. A motor vehicle steering wheel mounted worktable in accordance with claim 1, wherein:
   the stabilizing bar comprise a rectangular panel extending outwardly at a 90° angle positioned at a predetermined distance from the bottom of the work table making contact with the steering wheel at approximately the 5 o'clock and 7 o'clock positions thereby stabilizing the work table and preventing left or right rocking movement and lifting the work table upwardly and causing the angled studs to tilt downwardly locking the table in place.

5. A motor vehicle steering wheel mounted worktable in accordance with claim 2, further including:
   hinge means attaching the stabilizing bar to the bottom of the work table to permit the stabilizing bar to pivot against the table to facilitate movement and storage of the table.

6. A motor vehicle steering wheel mounted worktable in accordance with claim 2, further including:
   a rectangular tab extending outwardly from the lower intermediate surface of the table for a predetermined short distance to facilitate carrying the worktable.

7. A motor vehicle steering wheel mounted worktable in accordance with claim 1, wherein:
   the worktable surface is 20 inches in length by 15 inches in height.

* * * * *